United States Patent
Novacek et al.

(10) Patent No.: US 8,967,319 B2
(45) Date of Patent: Mar. 3, 2015

(54) HORIZONTAL MUFFLER FOR AN AGRICULTURAL VEHICLE

(71) Applicant: CNH America LLC, New Holland, PA (US)

(72) Inventors: Jason Keith Novacek, West Fargo, ND (US); Daniel John Zurn, Horace, ND (US); Keith James Ward, Racine, WI (US); Jay Michael Larson, Fargo, ND (US); David Larry Tveito, West Fargo, ND (US); Russell Victor Stoltman, Argusville, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/669,247

(22) Filed: Nov. 5, 2012

(65) Prior Publication Data

US 2014/0124283 A1    May 8, 2014

(51) Int. Cl.
*B60K 13/04*    (2006.01)
(52) U.S. Cl.
CPC ..................................... *B60K 13/04* (2013.01)
USPC ........................................................ 180/309
(58) Field of Classification Search
USPC ........................................................ 180/309
See application file for complete search history.

(56) References Cited

U.S. PATENT DOCUMENTS

| | | | |
|---|---|---|---|
| 4,265,332 A * | 5/1981 | Presnall et al. | 181/211 |
| 4,614,086 A | 9/1986 | Koch | |
| 4,766,983 A | 8/1988 | Tamba et al. | |
| 5,689,953 A | 11/1997 | Yamashita et al. | |
| 6,983,728 B1 | 1/2006 | Banks, Jr. et al. | |
| 2012/0124968 A1 | 5/2012 | Tamamidis | |

FOREIGN PATENT DOCUMENTS

| | | |
|---|---|---|
| DE | 3541336 A1 | 5/1987 |
| JP | 2011230638 A | 11/2011 |

* cited by examiner

*Primary Examiner* — Jeffrey J Restifo
*Assistant Examiner* — Erez Gurari
(74) *Attorney, Agent, or Firm* — Sue C. Watson

(57) ABSTRACT

A horizontal muffler for an agricultural vehicle is provided. One agricultural vehicle includes an exhaust system having a muffler configured to direct exhaust out of an engine and to reduce a noise of the exhaust. The agricultural vehicle also includes a steering wheel configured to control steering of the agricultural vehicle. The muffler is disposed forward of the steering wheel relative to a direction of travel of the agricultural vehicle. Moreover, the muffler extends in a substantially horizontal direction such that a flow of the exhaust through the muffler is substantially parallel to a ground surface.

23 Claims, 5 Drawing Sheets

HORIZONTAL MUFFLER FOR AN AGRICULTURAL VEHICLE

BACKGROUND

The invention relates generally to exhaust systems and, more particularly, to a horizontal muffler for an agricultural vehicle.

Exhaust systems are used to guide exhaust gasses away from a controlled combustion device, such as an engine. Exhaust systems may include components such as a cylinder head, an exhaust manifold, a turbocharger, and a muffler (e.g., silencer). In an exhaust system, exhaust gasses of each cylinder of the combustion device exit the combustion device through the cylinder head. Thereafter, the exhaust manifold collects the exhaust gasses from the cylinders into one or more conduits or pipes. In some exhaust systems, the flow of the exhaust gasses may be directed from the conduits through the turbocharger. Accordingly, the exhaust gasses may be used to drive a turbine of the turbocharger to induce rotation of an impeller, which compresses air used by the combustion device. The exhaust gasses flow through a muffler that directs the exhaust gasses out of the exhaust system and reduces noise of the exhaust. Certain agricultural vehicles, such as tractors, may include a muffler that extends vertically within a line of sight of a driver of the vehicle. As such, the muffler may at least partially obstruct the vision of the driver.

BRIEF DESCRIPTION

In one embodiment, an agricultural vehicle includes an exhaust system having a muffler configured to direct exhaust out of an engine and to reduce a noise of the exhaust. The agricultural vehicle also includes a steering wheel configured to control steering of the agricultural vehicle. The muffler is disposed forward of the steering wheel relative to a direction of travel of the agricultural vehicle. Moreover, the muffler extends in a substantially horizontal direction such that a flow of the exhaust through the muffler is substantially parallel to a ground surface.

In another embodiment, an agricultural vehicle includes an exhaust system having a muffler configured to direct exhaust out of an engine and to reduce a noise of the exhaust. The agricultural vehicle also includes a plurality of front wheels and a plurality of rear wheels. The muffler is disposed over one of the plurality of front wheels.

In another embodiment, an agricultural vehicle includes an exhaust system having a muffler configured to direct exhaust out of an engine and to reduce a noise of the exhaust. The agricultural vehicle also includes a cabin. The muffler is disposed forward of the cabin relative to a direction of travel of the agricultural vehicle. Moreover, the muffler extends in a substantially horizontal direction such that a flow of the exhaust through the muffler is substantially parallel to a ground surface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
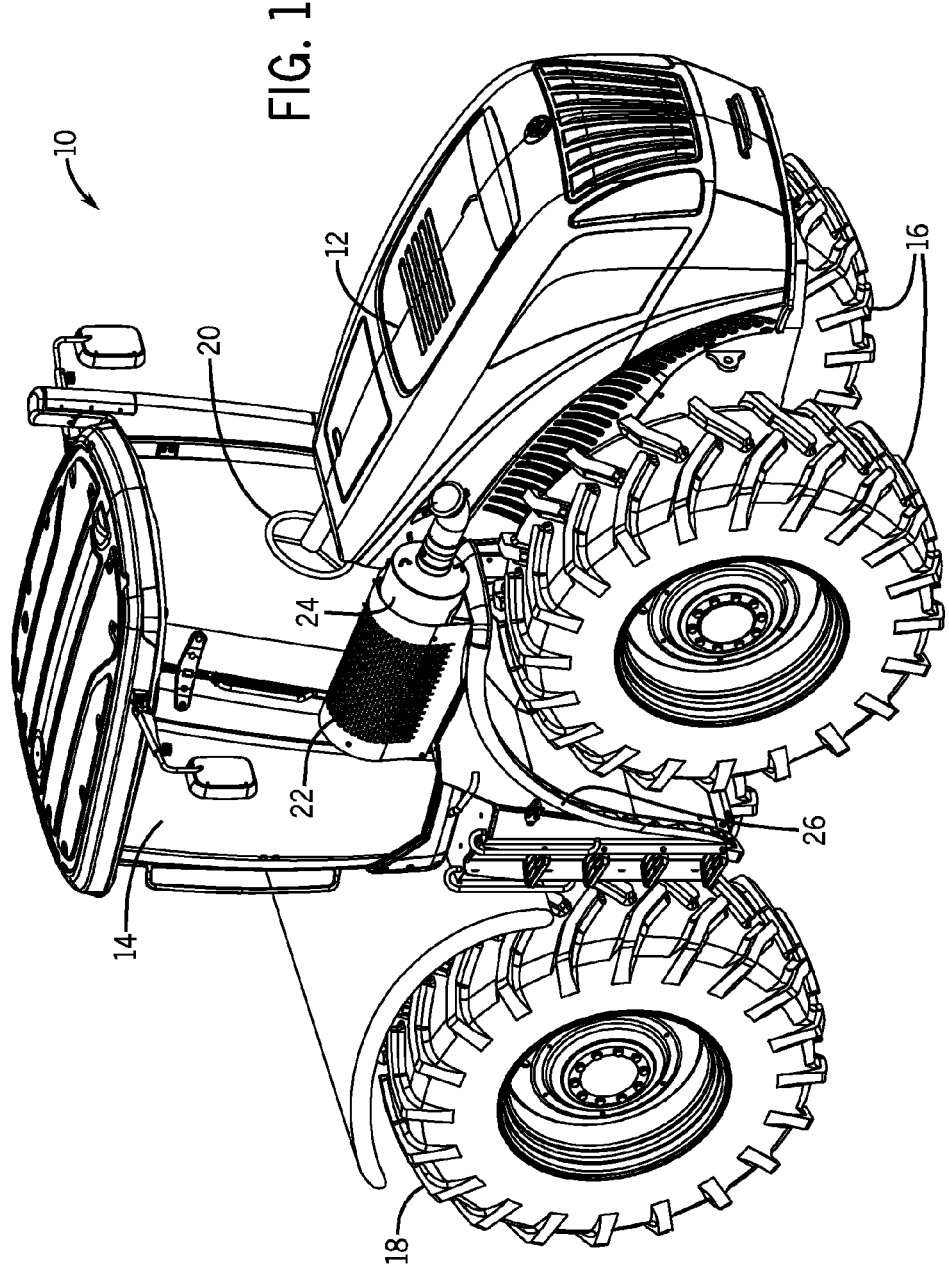
FIG. 1 is a perspective view of an embodiment of an agricultural vehicle with a horizontal muffler in accordance with the present disclosure.

FIG. 1 is a perspective view of an embodiment of an agricultural vehicle 10 with a horizontal muffler. In certain embodiments, the agricultural vehicle 10 may be any type of tractor, off-road vehicle, work vehicle, or any other suitable vehicle that utilizes an exhaust system. The agricultural vehicle 10 has a body 12 that typically houses an engine, transmission, and power train. Furthermore, the agricultural vehicle 10 has a cabin 14 where an operator may sit or stand to operate the agricultural vehicle 10. The agricultural vehicle 10 has two front wheels 16 and two rear wheels 18 that rotate to move the agricultural vehicle 10. As may be appreciated, the agricultural vehicle 10 is maneuvered using a steering wheel 20 configured to turn the front wheels 16 (or the rear wheels 18) to control the steering of the agricultural vehicle 10.

The agricultural vehicle 10 includes an exhaust system 22. As illustrated, the exhaust system 22 includes a muffler 24 (e.g., silencer) configured to direct exhaust out of the engine of the agricultural vehicle 10. The muffler 24 is also configured to reduce a noise of the exhaust. For example, the muffler 24 may be designed to reduce the magnitude of sound pressure oscillations created by the engine by damping the oscillations. As illustrated, the muffler 24 is mounted so that a length (i.e., longitudinal axis) of the muffler 24 extends in a substantially horizontal direction. Specifically, the muffler 24 is mounted directly over a fender 26 of one front wheel 16. Furthermore, the muffler 24 is mounted forward of the cabin 14, forward of the steering wheel 20, and adjacent to the body 12 of the agricultural vehicle 10. Such a position and orientation of the muffler 24 may place the muffler 24 out of a line of sight of an operator within the cabin 14, thereby enhancing visibility of the operator.

Figure 2:
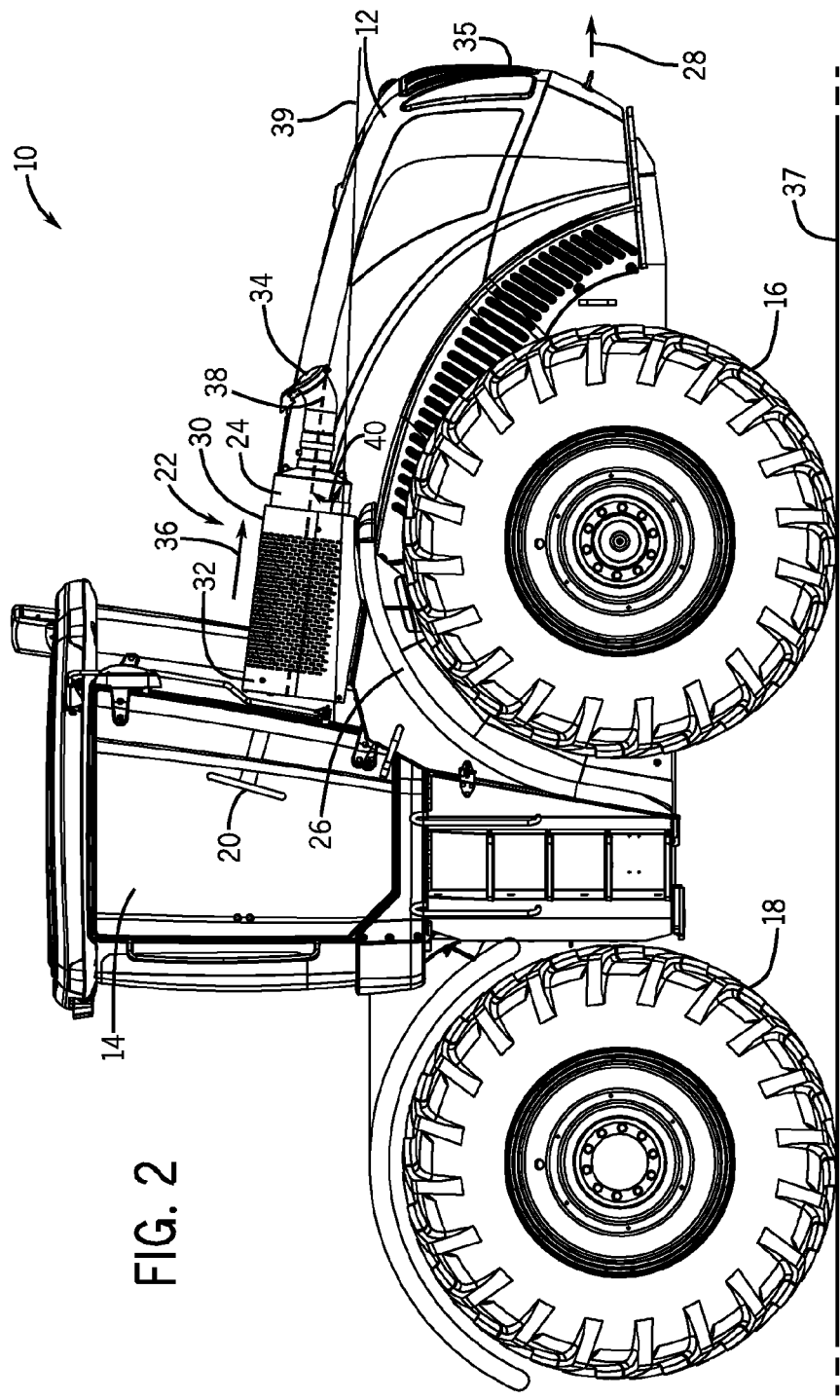
FIG. 2 is a side view of the agricultural vehicle of FIG. 1 with the horizontal muffler in accordance with the present disclosure.

FIG. 2 is a side view of the agricultural vehicle 10 of FIG. 1 with the horizontal muffler 24. As may be appreciated, the agricultural vehicle 10 generally moves in a direction of travel illustrated by arrow 28. The muffler 24 is disposed forward of the cabin 14 and the steering wheel 20 relative to the direction of travel of the agricultural vehicle 10. Moreover, the muffler 24 extends in a direction substantially parallel to a horizontal plane. As exhaust flows through the muffler 24, the muffler 24 may increase in temperature. Accordingly, the exhaust system 22 includes a heat shield 30 that covers at least a portion of the muffler 24 and may shield the muffler 24 from being contacted. Moreover, the heat shield 30 may facilitate cooling of the muffler 24.

During operation of the agricultural vehicle 10, exhaust flows from the engine of the agricultural vehicle 10 into a rear end 32 of the muffler 24. The rear end 32 of the muffler 24 is positioned adjacent to the cabin 14 and closer to the cabin 14 than a front end 34 of the muffler 24 along a horizontal direction. In other words, the front end 34 of the muffler 24 is horizontally farther from the cabin 14 than the rear end 32 of the muffler 24. Within the muffler 24, exhaust flows from the rear end 32 to the front end 34 where the exhaust exits the muffler 24. Accordingly, as the exhaust flows from the rear end 32 to the front end 34 of the muffler 24, the exhaust flows generally toward a front end 35 of the agricultural vehicle 10. Arrow 36 illustrates the general direction of exhaust flow. As may be appreciated, the flow of exhaust through the muffler 24 is substantially parallel to a ground surface 37 (e.g., a horizontal plane), such as a field that the agricultural vehicle 10 moves across.

As illustrated, a longitudinal axis 38 of the muffler 24 extends toward a horizontal plane 39 at an angle 40. As may be appreciated, the horizontal plane 39 is parallel to the ground surface 37. Accordingly, an angle 40 of less than 20 degrees means "substantially" horizontal and/or "substantially" parallel to the ground surface 37. With the muffler 24 positioned and oriented to extend substantially horizontally, visibility of an operator of the agricultural vehicle 10 may be improved.

Figure 3:
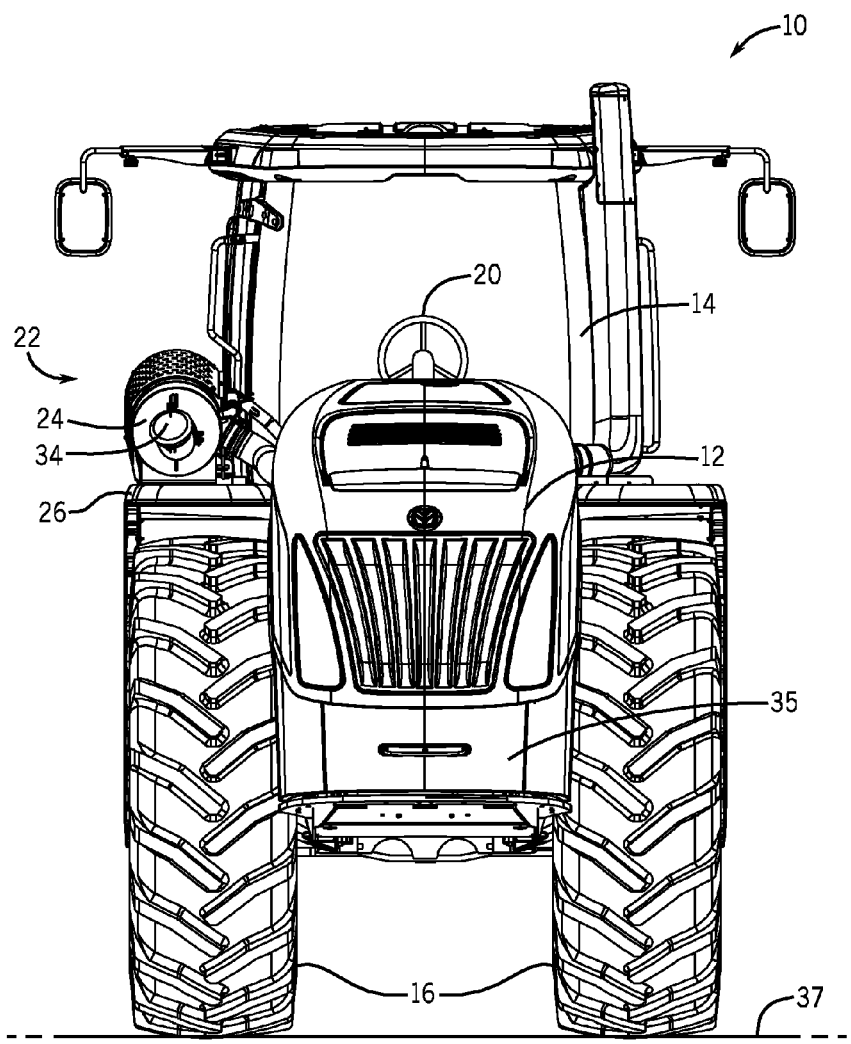
FIG. 3 is a front view of the agricultural vehicle of FIG. 1 with the horizontal muffler in accordance with the present disclosure.

FIG. 3 is a front view of the agricultural vehicle 10 of FIG. 1 with the horizontal muffler 24. As illustrated, by orienting the muffler 24 horizontally the muffler 24 may not obstruct the vision of an operator within the cabin 14. For example, in certain embodiments, the muffler 24 may not be visible to the operator within the cabin 14. Moreover, in other embodiments, the muffler 24 may be visible to the operator within the cabin 14, but may not obstruct a view of the field. In either case, the muffler 24 extends in a substantially horizontal direction. Accordingly, visibility of an operator of the agricultural vehicle may be enhanced by the substantial horizontal orientation of the muffler 24.

Figure 4:
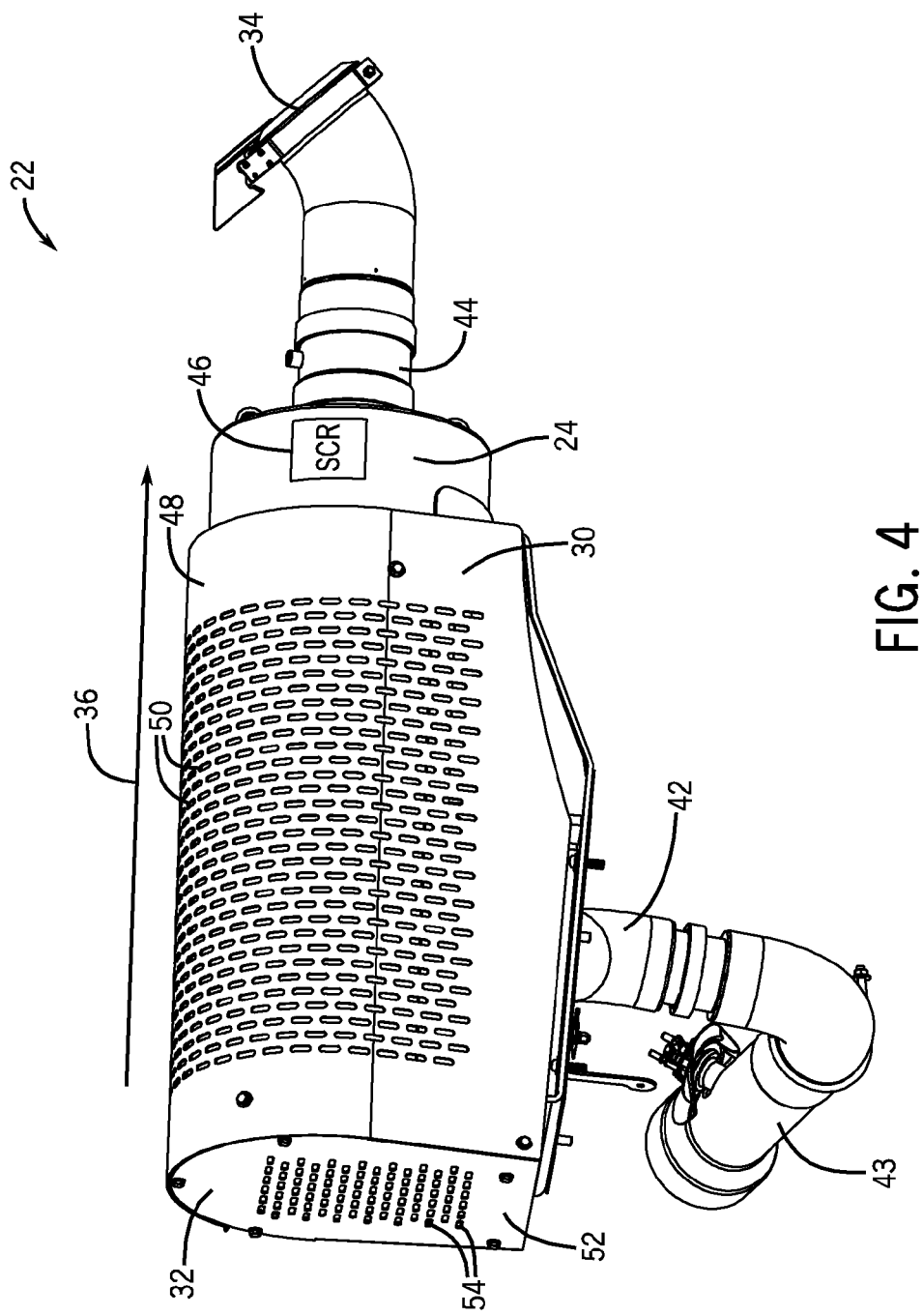
FIG. 4 is a perspective view of an embodiment of an exhaust system that may be employed with the agricultural vehicle of FIG. 1.

FIG. 4 is a perspective view of an embodiment of the exhaust system 22 that may be employed with the agricultural vehicle 10 of FIG. 1. As illustrated, the muffler 24 includes an exhaust inlet 42 configured to receive exhaust from the engine of the agricultural vehicle 10. A conduit or pipe 43 is coupled to the exhaust inlet 42 and may couple the exhaust inlet 42 to an exhaust manifold or to a turbocharger. The muffler 24 also includes an exhaust outlet 44 configured to direct exhaust to exit the exhaust system 22. When installed on the agricultural vehicle 10, the exhaust outlet 44 is disposed farther from the cabin 14 and the steering wheel 20 than the exhaust inlet 42 along the horizontal direction. In other words, the exhaust inlet 42 is disposed closer horizontally to the cabin 14 and the steering wheel 20 than the exhaust outlet 44. The muffler 24 may be any suitable device that facilitates noise reduction. Moreover, in the illustrated embodiment, the muffler 24 includes a selective catalytic reduction (SCR) 46 to facilitate reducing emissions of the exhaust as the exhaust flows through the muffler 24. For example, with the aid of a catalyst, the SCR 46 may convert nitrogen oxides into diatomic nitrogen and water.

The exhaust system 22 includes the heat shield 30 to block direct contact with the muffler 24. Furthermore, the heat shield 30 includes an arched portion 48 that extends around a portion of the muffler 24. The arched portion 48 includes openings 50 to facilitate cooling of the muffler 24. The heat shield 30 also includes a rear cover 52 to block direct contact with the rear end 32 of the muffler 24. Similar to the arched portion 48, the rear cover 52 also includes openings 54 to facilitate cooling of the muffler 24. As discussed above, the exhaust system 22 may be oriented so that exhaust flowing through the muffler 24 flows in a substantially horizontal direction, (e.g., substantially parallel to the ground surface 37). Accordingly, the muffler 24 may be positioned and/or oriented to enhance visibility of an operator maneuvering the agricultural vehicle 10.

Figure 5:
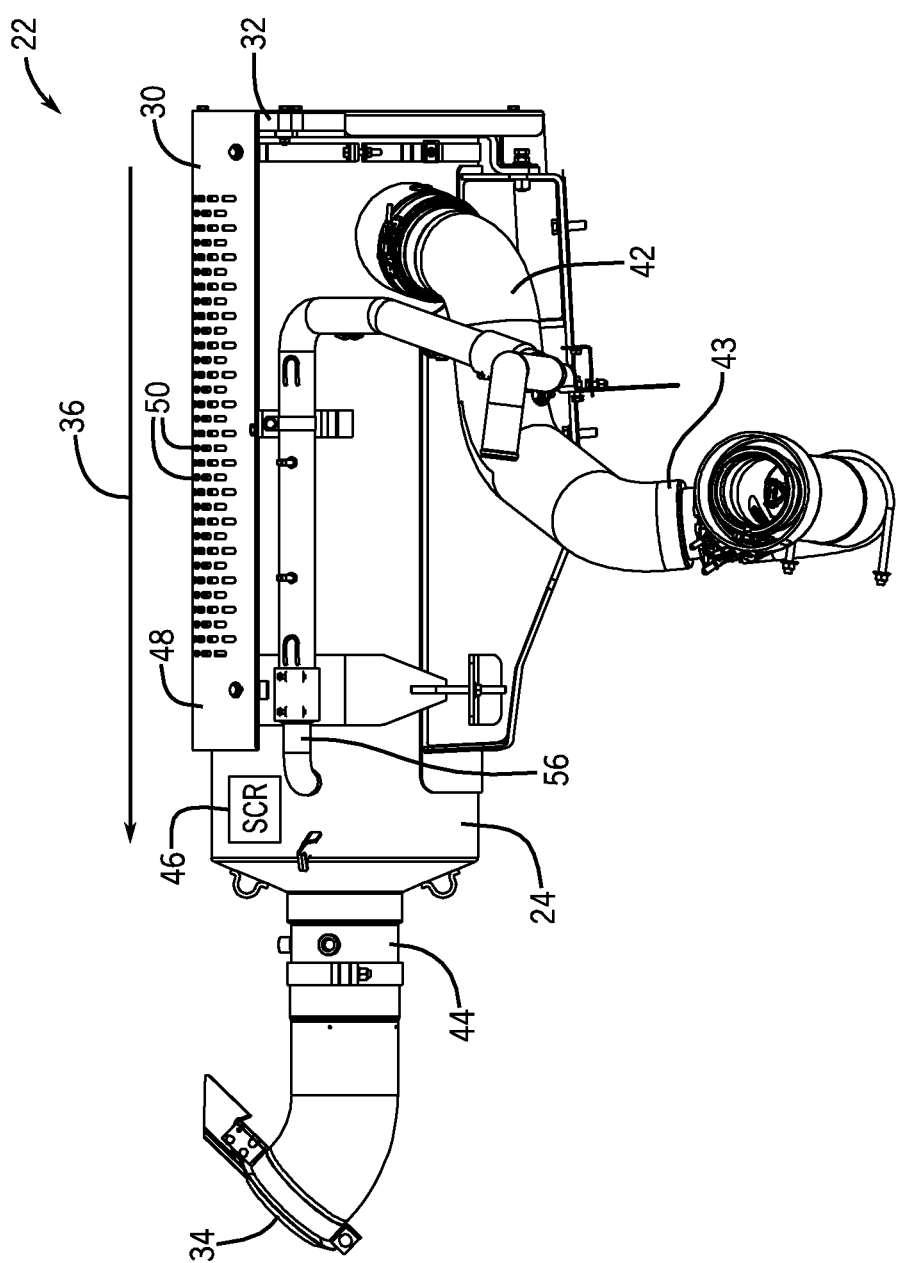
FIG. 5 is another perspective view of the exhaust system of FIG. 4.

FIG. 5 is another perspective view of the exhaust system 22 of FIG. 4. As illustrated, the muffler 24 includes an air intake 56. As may be appreciated, the air intake 56 enables air to be received into the muffler 24. In certain embodiments, air received from the air intake 56 may be used within the SCR 46 for reducing emissions. As illustrated, the heat shield 30 covers an upper portion of the muffler 24, but does not extend completely around the muffler 24. However, in other embodiments, the heat shield 30 may extend around a greater or lesser portion of the muffler 24. Certain features of the exhaust system 22 may vary between embodiments, such as a location of the exhaust inlet 42 and a location of the exhaust outlet 44. Furthermore, the conduits used to connect the muffler 24 to other components of the exhaust system 22 may vary in size, shape, routing, and/or configuration. By using the illustrated exhaust system 22, the muffler 24 may be oriented substantially horizontally (e.g., substantially parallel to a ground surface). Accordingly, the muffler 24 may be positioned and/or oriented to reduce obstructions in the line of sight of an operator of the agricultural vehicle 10, thereby enhancing the ability of the operator to maneuver the agricultural vehicle 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural vehicle comprising:
   a body housing an engine;
   an exhaust system having a muffler configured to direct exhaust out of the engine and to reduce a noise of the exhaust; and
   a steering wheel configured to control steering of the agricultural vehicle;
   wherein the muffler is disposed forward of the steering wheel relative to a direction of travel of the agricultural vehicle and is positioned outside of and adjacent to the body of the agricultural vehicle, and wherein the muffler extends in a substantially horizontal direction such that a flow of the exhaust through the muffler is substantially parallel to a ground surface; and
   wherein the agricultural vehicle also comprises a plurality of front wheels and a plurality of rear wheels each configured to facilitate movement of the agricultural vehicle, and a fender extending around at least a portion of one of the front wheels, at least a portion of the muffler mounted directly over the fender.

2. The agricultural vehicle of claim 1, wherein the muffler comprises a selective catalytic reduction (SCR) unit configured to reduce emissions of the exhaust.

3. The agricultural vehicle of claim 1, wherein the muffler comprises an exhaust inlet and an exhaust outlet, and wherein the exhaust outlet is disposed farther from the steering wheel than the exhaust inlet along the horizontal direction.

4. The agricultural vehicle of claim 1, comprising a cabin containing the steering wheel, wherein the muffler is positioned to be at least partially visible from within the cabin.

5. The agricultural vehicle of claim 1, wherein the muffler extends toward a horizontal plane at an angle greater than zero and less than 20 degrees.

6. The agricultural vehicle of claim 1, comprising a cabin containing the steering wheel, wherein the muffler is positioned to not be visible from within the cabin.

7. The agricultural vehicle of claim 1, wherein the exhaust system comprises a heat shield configured to cover at least a portion of the muffler, the heat shield including a rear cover to block contact with a rear end of the muffler.

8. An agricultural vehicle comprising:
a body housing an engine;
an exhaust system having a muffler configured to direct exhaust out of the engine and to reduce a noise of the exhaust; and
a steering wheel configured to control steering of the agricultural vehicle;
wherein the muffler is disposed forward of the steering wheel relative to a direction of travel of the agricultural vehicle and is positioned outside of and adjacent to the body of the agricultural vehicle, and wherein the muffler extends in a substantially horizontal direction such that a flow of the exhaust through the muffler is substantially parallel to a ground surface, and
wherein the muffler extends longitudinally in a direction substantially parallel to the direction of travel of the agricultural vehicle such that the flow of the exhaust through the muffler is generally toward a front end of the agricultural vehicle.

9. The agricultural vehicle of claim 8, wherein the muffler comprises a selective catalytic reduction (SCR) unit configured to reduce emissions of the exhaust.

10. The agricultural vehicle of claim 8, wherein the muffler comprises an exhaust inlet and an exhaust outlet, and wherein the exhaust outlet is disposed farther from the steering wheel than the exhaust inlet along the horizontal direction.

11. The agricultural vehicle of claim 8, comprising a cabin containing the steering wheel, wherein the muffler is positioned to be at least partially visible from within the cabin.

12. The agricultural vehicle of claim 8, wherein the muffler extends toward a horizontal plane at an angle greater than zero and less than 20 degrees.

13. The agricultural vehicle of claim 8, comprising a cabin containing the steering wheel, wherein the muffler is positioned to not be visible from within the cabin.

14. The agricultural vehicle of claim 8, wherein the exhaust system comprises a heat shield configured to cover at least a portion of the muffler, the heat shield including a rear cover to block contact with a rear end of the muffler.

15. An agricultural vehicle comprising:
an exhaust system having a muffler configured to direct exhaust out of an engine and to reduce a noise of the exhaust; and
a steering wheel configured to control steering of the agricultural vehicle;
wherein the muffler is disposed forward of the steering wheel relative to a direction of travel of the agricultural vehicle, and wherein the muffler extends longitudinally in a direction substantially parallel to the direction of travel of the agricultural vehicle, such that a flow of the exhaust through the muffler is substantially parallel to a ground surface; and
wherein the agricultural vehicle also comprises a fender extending around at least a portion of a front wheel of the agricultural vehicle, at least a portion of the muffler mounted directly over the fender.

16. The agricultural vehicle of claim 15, wherein the muffler comprises a selective catalytic reduction (SCR) unit configured to reduce emissions of the exhaust.

17. The agricultural vehicle of claim 15, comprising a plurality of front wheels and a plurality of rear wheels each configured to facilitate movement of the agricultural vehicle.

18. The agricultural vehicle of claim 17, wherein the muffler is disposed over one of the plurality of front wheels.

19. The agricultural vehicle of claim 15, wherein the exhaust system comprises a heat shield configured to cover at least a portion of the muffler.

20. The agricultural vehicle of claim 19, wherein the heat shield includes a rear cover to block contact with a rear end of the muffler.

21. The agricultural vehicle of claim 15, further comprising a body housing the engine, wherein the muffler is positioned adjacent to the body of agricultural vehicle.

22. The agricultural vehicle of claim 15, wherein the muffler extends toward a horizontal plane at an angle greater than zero and less than 20 degrees.

23. The agricultural vehicle of claim 15, wherein the flow of the exhaust through the muffler is generally toward a front end of the agricultural vehicle.

* * * * *